United States Patent [19]

Bays

[11] Patent Number: 4,853,907
[45] Date of Patent: Aug. 1, 1989

[54] INCLINABLE VIBRATORY SEISMIC SOURCE

[75] Inventor: Marvin G. Bays, Ponca City, Okla.

[73] Assignee: Atlantic Richfield Company, Los Angeles, Calif.

[21] Appl. No.: 312,129

[22] Filed: Feb. 17, 1989

[51] Int. Cl.$^4$ .............................................. G01V 1/02
[52] U.S. Cl. .................................... 367/189; 181/119; 181/121
[58] Field of Search ............... 181/113, 114, 119, 121, 181/401; 367/75, 143, 189, 190

[56] References Cited

U.S. PATENT DOCUMENTS

| | | | |
|---|---|---|---|
| 3,159,233 | 12/1964 | Clynch | 367/189 |
| 4,253,538 | 3/1981 | Weber et al. | 181/119 |
| 4,321,981 | 3/1982 | Waters | 181/119 |
| 4,655,314 | 4/1987 | Airhart | 181/113 |
| 4,660,674 | 4/1987 | Airhart | 181/113 |
| 4,660,675 | 4/1987 | Airhart | 181/113 |
| 4,662,473 | 5/1987 | Betz | 181/113 |
| 4,712,641 | 12/1987 | Chelminski | 181/113 |
| 4,719,607 | 1/1988 | Airhart | 367/189 |

*Primary Examiner*—Brian S. Steinberger
*Attorney, Agent, or Firm*—Roy L. Van Winkle

[57] ABSTRACT

An improved inclinable vibratory seismic source arranged to be vehicle mounted including a base plate mounted for movement relative to the vehicle frame and for engagement with the ground. Hydraulic cylinders are provided for raising and lowering the base plate. A shaft is connected to the base plate by a U-Joint and has a vibratory mass located thereon. Also, located on the shaft is a reaction mass that is resiliently coupled to the vibratory mass and tuned so that the reaction mass remains virtually vibration free. Control apparatus is connected to the reaction mass to position the shaft and vibratory mass at a preselected azimuth and inclination.

13 Claims, 3 Drawing Sheets

INCLINABLE VIBRATORY SEISMIC SOURCE

TECHNICAL FIELD OF THE INVENTION

This invention relates generally to apparatus for imparting seismic vibratory signals to the earth. More particularly, but not by way of limitation, this invention relates to improved apparatus for imparting seismic vibratory signals to the earth along a selected vector path.

BACKGROUND OF THE INVENTION

Recent advances in the ability of seismic data acquisition and processing equipment to handle large amounts of data have stimulated greater interest in the development of versatile high energy seismic sources adapted to produce both compensational and shear waves. One goal in the development of "multi-component" seismic sources is to enable the operator to more efficiently measure sub-surface formation properties such as porosity, fracture orientation, pore fluid type, or lithologic type. It is known that P, SH and SV waves travel with their own distinct velocities when passing through a particular geologic formation. Thus, changes in formation property, such as rock type, porosity and the like, may be detectable by changes in the full wave field (i.e., the P, SV and SH wave velocities). A strong correlation observed between lateral variations in the compressional to shear wave velocity ratio (Vp/Vs), with known changes in the geologic formation, suggests that these variations may be used to infer changes in the lithology, porosity, or pore fluid content of the sub-surface formation. By recording the full waveform of a seismic wave, including P, SH and SV waves, one can get far more detailed information concerning rock properties at depths than would otherwise be possible.

There are two major types of surface seismic sources currently available which have been adapted to the production of combined P, SH, and SV waves. One is the impulsive-type source wherein a heavy mass is propelled in a single downward stroke to impact a ground engaging target. The other is the reciprocating vibratory-type transducer which imparts a controlled, varying frequency signal into the earth, as exemplified by the Vibroseis ® reciprocating vibrator seismic source (a registered trademark of Conoco, Inc.). It is with the latter type of seismic source that the invention to be described is particularly concerned.

The general concept of simultaneously imparting both compressional and shear wave vibrational energy to the earth with seismic exploration apparatus is taught in U.S. Pat. No. 4,321,981 issued to K. H. Waters on Mar. 30, 1982, entitled "Combination Shear Wave and Compressional Wave Seismic Energy Vibrator." In accordance with the above referenced patent, a combination of two or more vibrating masses may be operated along opposing non-vertical vibrational axes, oriented at a fixed angle to each other in parallel planes. The times of passage of the masses through a common central point as they vibrate along their respective axes can be controlled to establish a phase relation between the two vibratory motions. By varying the related phases of the two masses, one can effect desired inputs of compressional and shear waves simultaneously.

The referenced Waters patent teaches that the parallel planes in which the respective vibration axes of the two masses lie are to be oriented either transversely to the line of seismic survey, i.e., the line between the location of the seismic source and the recording geophones, or along such survey line. With proper phasing, the above-referenced transverse axial orientation of the vibrating masses enables one to produce and record simultaneously P waves and shear SH waves. On the other hand, if the vibrational axes are aligned with the survey line, one can generate and record simultaneously P waves and shear SV waves. The vertical component of motion in both cases produces so called "Converted" shear SV waves, but such waves cannot be processed and interpreted with conventional seismic methods. Thus, Waters teaches in effect that only by operating the patented apparatus successively in these two modes can one generate and record at a single remote location all forms of a seismic wave, including P, SH and SV waves, in a manner which permits conventional processing.

In the field of seismic exploration today, data acquisition and processing equipment has been developed to handle large amounts of data generated by apparatus constructed to produce both compressional and shear waves.

Patents illustrating full wave field vibratory seismic sources include U.S. Pat. Nos. 4,662,473, issued May 5, 1987, to Robert M. Betz; 4,655,314 issued Apr. 7, 1987, to Tom P. Airhart; 4,660,675, issued Apr. 28, 1987, to Tom P. Airhart; and 4,719,607 issued Jan. 12, 1988 to Tom P. Airhart. Each of these patents illustrates apparatus capable of producing vibratory seismic waves at varying inclinations and azimuths without repositioning the ground engaging base plate of the apparatus or without repositioning the vehicle utilized for carrying such apparatus.

U.S. Pat. No. 4,719,607 illustrates a general design for a multi-component vibratory seismic apparatus. This invention described hereinafter is an improvement to that apparatus.

When conducting the seismic exploration of an area of interest, it is generally necessary that the vibratory seismic source be moved to a large number of locations. Accordingly, such apparatus is usually mounted on vehicles. These vehicles must include means for raising and lowering the ground engaging base plate and the vibratory source. They also usually include means for powering the vibratory source. An example of a vehicle mounted seismic source is illustrated in U.S. Pat. No. 4,660,674 issued Apr. 28, 1987, to Tom P. Airhart. It will be noted in that patent that the seismic source is not a vibratory seismic source, but rather utilizes a heavy mass that is propelled downwardly against the surface of the base plate to produce an instantaneous heavy shock wave thereto. Despite the differences in the type of seismic source illustrated, the patent does illustrate the mounting of a source on a vehicle such as is contemplated by this invention.

From the listed patents, it can be seen that a number of attempts have been made to control the inclination and azimuth of the vibratory source relative to the base plate. While the foregoing systems work satisfactorily, it would be highly desirable to more precisely, and in a shock isolated arrangement, control the inclination and the azimuth of the seismic source. Accordingly, an object of this invention is to provide improved shock isolated seismic apparatus for imparting seismic vibratory signals to the earth at more precise inclinations and azimuths.

SUMMARY OF THE INVENTION

This invention provides improved seismic apparatus for imparting seismic vibratory signals to the earth along selected vector paths. The apparatus is suitable for mounting on a vehicle frame and comprises a ground engaging base plate, lift means including a lift frame connectable with the vehicle frame and connected with the base plate whereby the base plate can be moved from a transport position out of engagement of the ground to an operating position engaging the ground, and vibratory means for producing the vibratory signals. The vibratory means includes a shaft having an axial centerline, a first end mounted on the base plate whereby the axial centerline can be located within preselected angles and at preselected azimuths, and a second end. A vibratory mass is mounted for limited reciprocating movement on the shaft intermediate the ends for imparting vibratory motion to the shaft, and a substantially vibration free reaction mass is moveably located on the shaft between the vibratory mass and the second end. Control means is provided for connecting the second end with the lift frame for positioning the axial centerline of the vibratory means at desired inclinations and azimuths. The control means includes variable length means, means for selectively and independently changing the length of the variable length means, and generating means for transmitting a signal to cause the variable length means to change length to position the vibratory means at a selected inclination and azimuth.

BRIEF DESCRIPTION OF THE DRAWING

The foregoing and additional objects and advantages of the invention will become more apparent when the following detailed description is read in conjunction with the accompanying drawing wherein like reference characters denote like parts in all views and wherein.

DETAILED DESCRIPTION OF THE PREFERRED EMBODIMENT

Figure 1:
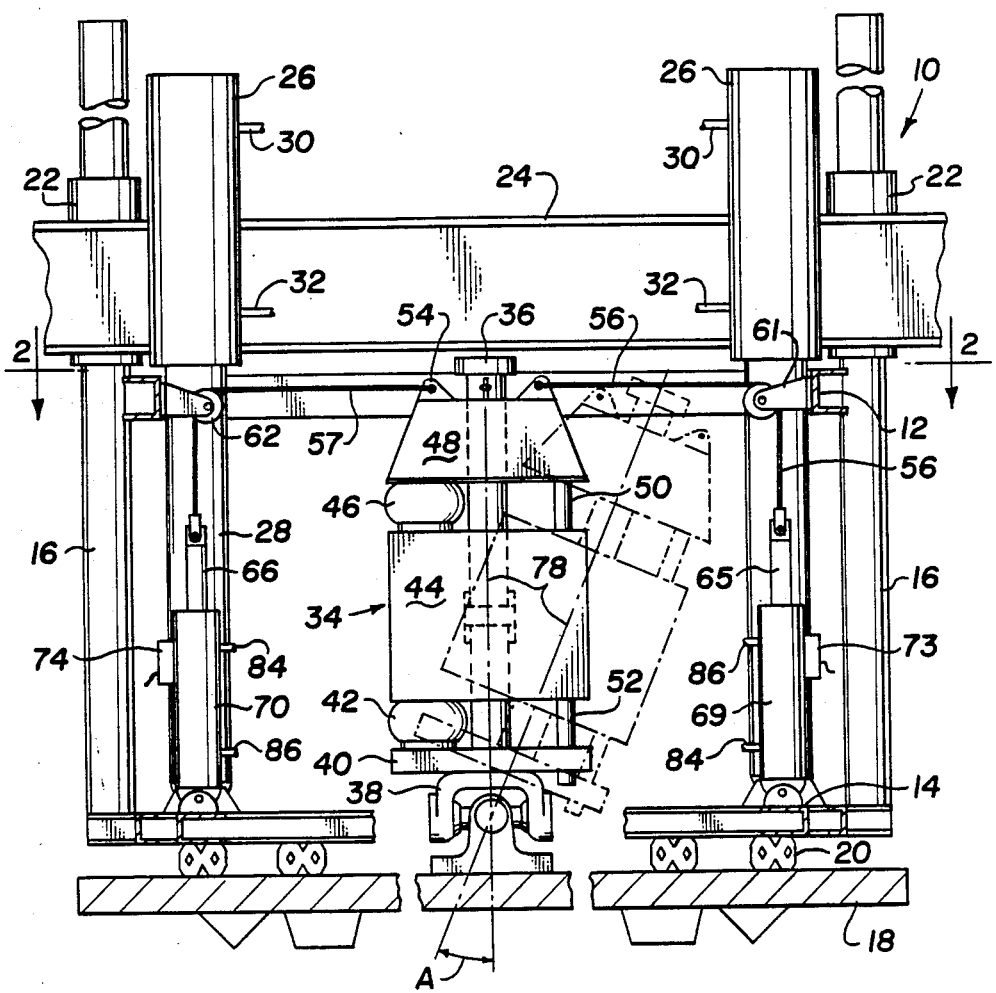
FIG. 1 is a view, partly in elevation and partly in cross-section illustrating vibratory seismic apparatus constructed in accordance with the invention, taken generally along the lines 1—1 of FIG. 2.
Figure 2:
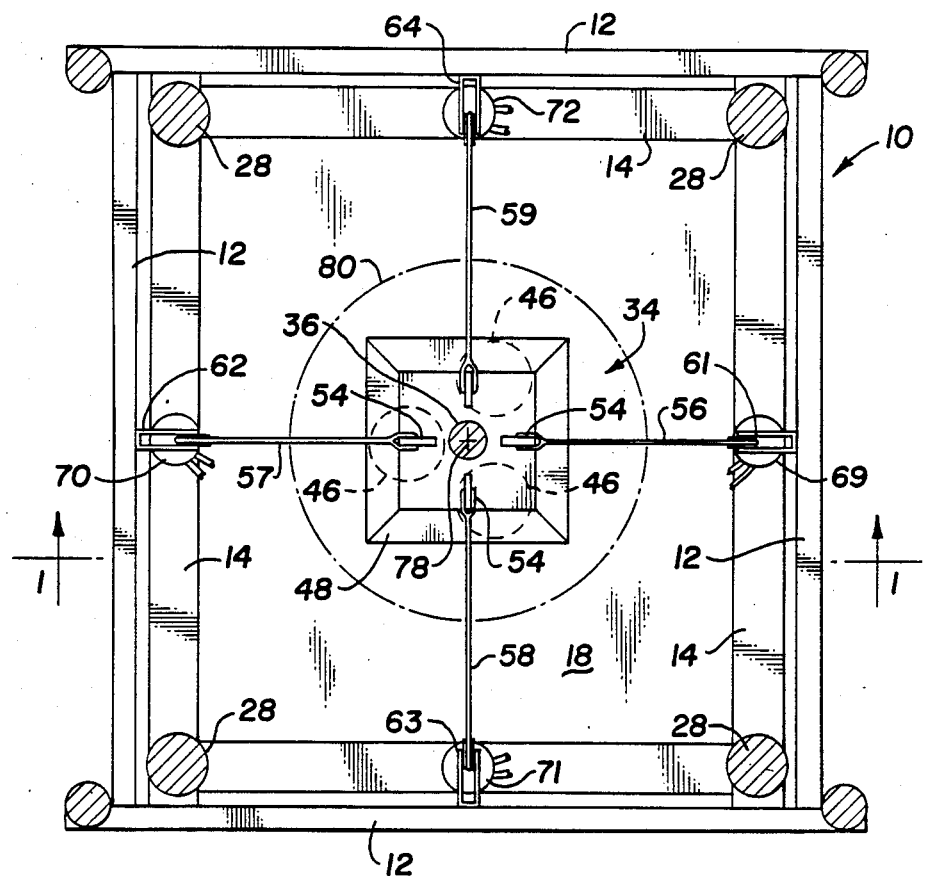
FIG. 2 is a top view, partly in cross-section, of the apparatus of FIG. 1, taken generally along the lines 2—2 of FIG. 1.

Referring to the drawing and to FIGS. 1 and 2 in particular, shown therein and generally designated by the reference character 10 is apparatus for producing vibratory seismic signals.

The vibratory apparatus 10 includes an upper lift frame 12 connected to a lower lift frame 14 by a plurality of guide posts or members 16. The lower ends of the posts 16 are connected to the lower lift frame 14 while the upper lift frame 12 is connected to the intermediate portion of the posts 16.

The lower lift frame 14 is connected to a ground engaging base plate 18 by a plurality of spaced shock absorbing members 20. Only four of the members 20 are illustrated, but it should be understood that an adequate number of the members 20 will be provided to support the base plate 18 in tension when the apparatus is in the raised position.

Each guide post 16 extends through a sleeve 22. The sleeves 22 may be attached to a vehicle frame 24 if the apparatus 10 is to be transportable by vehicle.

Lift cylinders 26 may also be attached to the vehicle frame 24. The lift cylinders 26 are double-acting hydraulic cylinders having a piston rod 28 extending therefrom. The free end of the piston rod 28 is attached to the lower lift frame 14. The lift cylinders 26 are utilized to raise and lower the base plate 18 relative to the frame 24 as the guide posts 16 slide through the sleeves 22. Although not illustrated, apparatus is provided for connection with the conduits 30 and 32 connected with each cylinder 26 for controlling the raising and lowering of the base plate 18.

The vibratory apparatus 10 also includes a vibrator generally designated by the reference character 34. A shaft 36 extends generally vertically through the vibrator 34 and has a first end that is free and a second end connected whereby the vibrator 34 can be rotated relative to the base plate 18, such as by a universal joint 38 to the base plate 18. Just above the U-joint 38, the shaft 36 is provided with an enlarged flange portion 40 that supports a plurality of isolators 42 which in turn support a vibratory mass 44.

The vibratory mass is of great weight and is arranged with the appropriate systems and controls for causing the mass 44 to vibrate or reciprocate the shaft 36 and, consequently, impart vibrations into the base plate 18.

Above the vibratory mass 44 there is provided a plurality of vibration isolation members 46 that support a reaction mass 48 which encircles the shaft 36 near the free end thereof. To permit reciprocatory movement and to prevent relative rotation between the shaft 36, vibratory mass 44 and reaction mass 48, guide rods such as are illustrated at 50 and 52 extend therebetween.

The airbag vibration isolators 42 and 46 are commonly used for isolation devices on seismic vibrators. Preferably, they are capable of being inflated so that they can be "tuned" to isolate such shocks and vibrations to protect the apparatus and so that the reaction mass 48 will remain stationary.

To permit the vibrator 34 to be tilted to the proper inclination and azimuth, the upper side of the reaction mass 48 is provided with a plurality of ears 54. Each ear 54 is connected, respectively, with a cable 56, 57, 58, and 59. Each cable extends over a respective swivel-mounted pully 61, 62, 63, and 64. The pullys are carried by the upper lift frame 12. The opposite end of each of the cables is connected to a respective piston 65, 66, 67, or 68.

The pistons are located in control cylinders 69, 70, 71, and 72, respectively. The control cylinders are each of the double-acting type and are mounted on the lower lift frame 14 so that they are raised and lowered, as the base plate 18 is raised and lowered relative to the vehicle frame 24.

Mounted on the control cylinders are sensors 73, 74, 75, and 76, respectively. Each sensor is arranged to transmit a signal indicative of the position of the piston rods in the control cylinder therein so that the inclination and azimuth of the vibrator 34 can be controlled. As may be seen more clearly in FIG. 2, an axial centerline 78 of the vibrator 34 may be positioned at any point within the circle described by line 80 which is the locus of the axial centerline 78 as the various control cylinders are actuated. The vibrator 34 can be tilted through an angle of about 22° relative to vertical.

Figure 3:
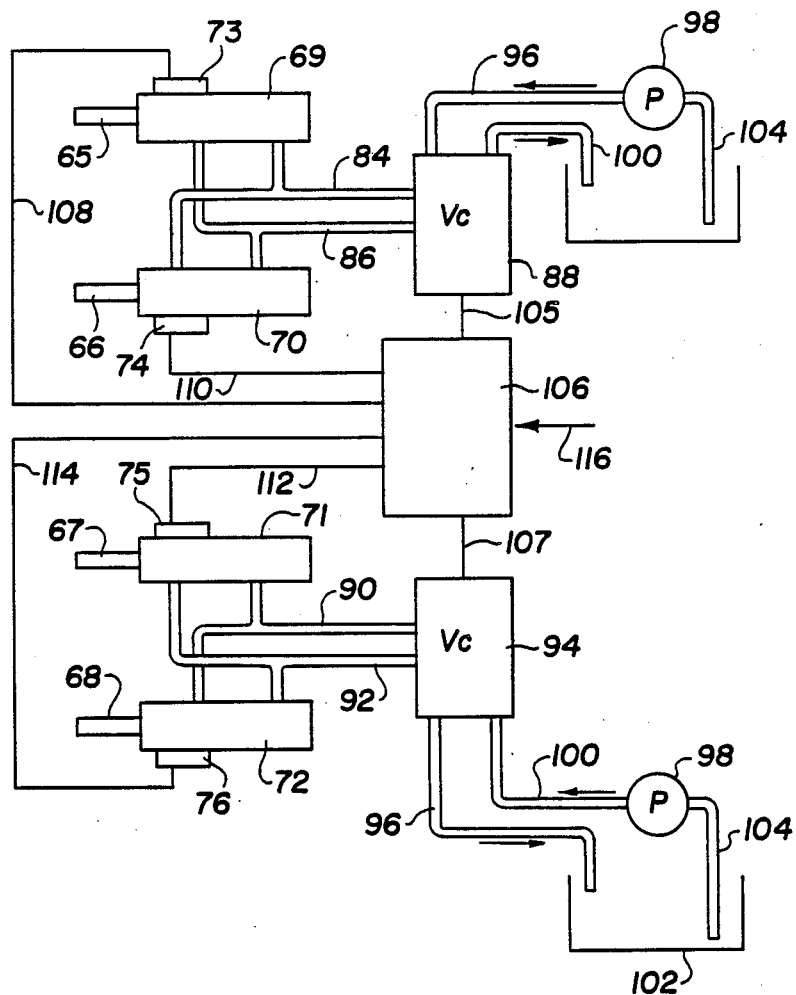
FIG. 3 is schematic diagram illustrating a typical circuit used for controlling the inclination and azimuth of vibratory apparatus that is constructed in accordance with the invention.

FIG. 3 illustrates the controls utilized for positioning the vibrator 34 at the desired inclination and azimuth. As illustrated therein, the cylinders 69 and 70 are connected by conduits 84 and 86 with a control valve 88. The arrangement is such that cylinders 69 and 70 move the pistons 65 and 66 therein in opposite directions. Similarly, the cylinders 71 and 72 are connected by conduits 90 and 92 with a second control valve 94. The control valves 88 and 94 may be identical if desired. Again, the arrangement between the cylinders 71 and 72 and the control valve 94 is such that the pistons 67 and 68 therein are caused to move in opposite directions.

It is desirable to be able to move the pistons in opposite directions simultaneously so that the cables tying the cylinders to the vibrator 34 are always in tension and, thus, maintain the vibrator 34 accurately at the desired inclination and azimuth.

To provide power for moving the pistons in the control cylinders, each of the control valves is connected by a conduit 96 with a pump 98 which is driven appropriately to provide hydraulic fluid through the control valves 88 and 94 to the control cylinders. A conduit 100 extends from each of the control valves to a reservoir 102, which is connected to supply hydraulic fluid to the pump 98 by a conduit 104.

To provide control for either positioning the vibrator 34 or for sensing the position thereof, a comparator 106 is connected by conductors 105 and 107 to the control valves. The comparator 106 is connected by a conductor 108 with the sensor 73, by a conductor 110 with the sensor 74, by a conductor 112 with the sensor 75 and by a conductor 114 with the sensor 76.

Upon receipt of an input signal 116 into the comparator 106, appropriate signals are transmitted to the control valves to position the control cylinders. As the pistons move in the control cylinders, the sensors transmit a signal indicative of such position to the comparator 106 which continues to reposition the control cylinders until such time as the signal transmitted by the sensors corresponds to the input signal indicating the desired inclination and azimuth of the vibrator 34.

OPERATION OF THE PREFERRED EMBODIMENT

When the apparatus 10 is vehicle mounted, the vehicle (not shown) will be positioned so that the axial centerline 78 of the vibrator 34 is positioned over the precise point where it is desired to impart vibratory seismic signals into the earth. Appropriate controls (not shown) are actuated to extend the pistons 28 from the lift cylinders 26 until the base plate 18 comes into engagement with the ground. When this occurs, further movement of the pistons 28 is arrested, but the cylinders 26 lift the frame 24 upwardly until all or part of the weight of the vehicle is resting on the base plate 18.

The vibrator 34 is then positioned in accordance with the desired angle of position of the vibratory signal through the base plate 18. Input signal 116 (see FIG. 3) is fed into the comparator 106 either manually or electronically. Upon receiving this signal, the comparator 106 transmits a signal through the conductors 105 and 107 to the control valves 88 and 94. The control valves are then positioned in accordance with the signal received.

When the control valves move to the proper positions, hydraulic fluid is introduced into the cylinders 69, 70, 71 and 72 through the appropriate conduits The fluid moves the pistons 65, 66, 67 and 68 to position the vibrator 34 by means of the cables 56, 57, 58 and 59 at the desired angle of inclination relative to the base plate 18 and at the desired azimuth.

During the movement of the pistons in the control cylinders, signals are generated in the sensors 73, 74, 75 and 76. These signals are transmitted to the comparator 106 through the conductors 108, 110, 112, and 114. When the signals generated by the sensors are combined in the comparator 106 and compared with the input signal 116, which is in accordance with the desired position of the vibrator 34, continued movement of the vibrator 34 occurs until the compared signals are equal. When this occurs, movement is arrested and the vibrator 34 is in the desired position for transmitting the vibratory motion into the earth.

As previously mentioned, no apparatus is illustrated for causing the vibrator 34 to oscillate. It should be understood that it is well-known in the art how such vibration is to be accomplished. An informative book on seismic vibrators is entitled *Reflection Seismology—A Tool for Energy Resource Exploration*. The author is Kenneth H. Waters and it was published by Wiley & Sons. The 3rd Edition was published in 1987.

Vibrations induced by the vibrator 34 involve very large forces and, consequently, it is highly desirable to isolate the vibrator 34 from all the apparatus with the exception of the shaft 36 and the base plate 18. Also, isolators 42 have been arranged to "counterbalance" mass 44 so vibrator 34 will have the same acceleration downward and upward, neutralizing the effect of gravity on mass 44.

Also, the vibration isolators 46 that have been placed between the vibratory mass 44 and the reaction mass 48 have been tuned so that the reaction mass 48 remains essentially stationary. Accordingly, there is provided a plurality of vibration isolating couplings 20 between the vibrator 34 and the remainder of the apparatus, with the exception of shaft 36 and the base plate 18, which isolate the motion of the vibrator 34 from the supporting vehicle.

The use of the cables 56, 57, 58, and 59 to connect the control cylinders with the vibrator 34 also aids in isolating the remainder of the apparatus from the vibration of the vibrator 34. The use of control cylinders disposed at substantially right angles to each other simplifies the problems involved in accurately locating the vibrator 34 at the desired inclination and azimuth.

Having described but a single embodiment of the invention, it will be appreciated that many changes and modifications can be made thereto without departing from the spirit or scope of the invention.

What is claimed is:

1. Vibratory apparatus for imparting seismic vibratory signals to the earth along a selected vector path, said apparatus being suitable for mounting on a vehicle frame for transportation and comprising:
   a ground-engaging base plate;
   lift means including a lift frame connectable with the vehicle frame and said base plate whereby said base plate can be moved from a transport position out of engagement with the ground to an operating position engaging said ground;
   vibratory means for producing said vibratory signals, said vibratory means including a shaft having an axial centerline, a first end moveably mounted on said base plate whereby said axial centerline can be located within preselected angles and at preselected azimuths, a second end, a vibratory mass mounted for limited reciprocating movement on said shaft intermediate said ends for imparting vibratory motion to said shaft and a substantially vibration free reaction mass moveably located on said shaft between said vibratory mass and said second end; and control means connecting said second end with said lift frame for positioning the axial centerline of said vibratory means at desired inclinations and at desired azimuths, said control means including variable length means, means for selectively and independently changing the length of each variable length means, and generating means for transmitting a signal to cause said variable length means to change length to position said vibratory means at a selected inclination and azimuth.

2. The apparatus of claim 1 wherein said vibratory means also includes:
vibration isolator means disposed between said reaction mass and vibratory mass; and,
mass counterbalancing isolator means disposed between the first end of said shaft and said vibratory mass.

3. The apparatus of claim 2 wherein said vibratory means also includes guide means for preventing relative rotation among said shaft, vibratory mass, and reaction mass.

4. The apparatus of claim 2 wherein the first end of said shaft has an enlargement thereon and said mass counterbalancing isolator means includes at least one isolator member located between the enlargement on said shaft and vibratory mass for supporting said vibratory mass on said shaft.

5. The apparatus of claim 4 wherein said mass counterbalancing isolator means includes a plurality of spaced, isolator members located between said shaft and vibratory mass.

6. The apparatus of claim 5 wherein each said variable length means includes:
a first end connected to said reaction mass; and
a second end connected to said lift frame.

7. The apparatus of claim 6 wherein each said variable length means also includes
a powered cylinder mounted on said lift frame and having a piston moveable therein; and
cable means having one end connected to each said piston and having another end connected to said reaction mass.

8. The apparatus of claim 5 wherein said mass counterbalancing isolator means includes at least one inflatable isolator member tuned to isolate the vibrations of said vibratory mass and shaft whereby said reaction mass is substantially vibration free.

9. The apparatus of claim 2 wherein said vibration isolator means includes a plurality of vibration isolating members located between said reaction mass and vibratory mass for preventing vibration of said reaction mass.

10. The apparatus of claim 2 wherein each said variable length means includes:
a first end connected to said reaction mass; and
a second end connected to said lift frame.

11. The apparatus of claim 10 wherein each said variable length means also includes:
a powered cylinder mounted on said lift frame and having a piston moveable therein; and,
cable means having one end connected to each said piston and having another end connected to said reaction mass.

12. The apparatus of claim 2 wherein said vibration isolator means includes at least one inflatable vibration isolating member tuned to isolate the vibrations of said vibratory mass and shaft whereby said reaction mass is substantially vibration free.

13. The apparatus of claim 2 wherein each said variable length means is located generally at a right angle to another of said variable length means when the axial centerline of said shaft is disposed substantially perpendicularly to an upper surface of said base plate.

* * * * *

UNITED STATES PATENT AND TRADEMARK OFFICE
CERTIFICATE OF CORRECTION

PATENT NO. : 4,853,907
DATED : Aug. 1, 1989
INVENTOR(S) : Marvin G. Bays

It is certified that error appears in the above-identified patent and that said Letters Patent is hereby corrected as shown below:

Column 8, line 1, "6." should read --- 9. ---.

Column 8, line 5, "7." should read --- 10. ---, referring to claim 9.

Column 8, line 6, insert after "includes" --- : ---.

Column 8, line 12, "8." should read --- 13. ---.

Column 8, line 17, "9." should read --- 6. ---.

Column 8, line 21, "10." should read --- 7. ---.

Column 8, line 25, "11." should read --- 8. ---, referring to claim 7.

Column 8, line 32, "12." should read --- 11. ---.

Column 8, line 37, "13." should read --- 12. ---.

Signed and Sealed this

Thirty-first Day of July, 1990

*Attest:*

HARRY F. MANBECK, JR.

*Attesting Officer*  *Commissioner of Patents and Trademarks*